INVENTOR.
CHARLES R. ELLIS
BY

March 2, 1971 C. R. ELLIS 3,566,594
TREE FRUIT HARVESTER AND PICKING DEVICES
Filed Aug. 12. 1969 7 Sheets-Sheet 3

INVENTOR.
CHARLES R. ELLIS
BY
Roger L. Martin

March 2, 1971 C. R. ELLIS 3,566,594
TREE FRUIT HARVESTER AND PICKING DEVICES
Filed Aug. 12, 1969 7 Sheets-Sheet 4

INVENTOR.
CHARLES R. ELLIS
BY
Roynhi Martin

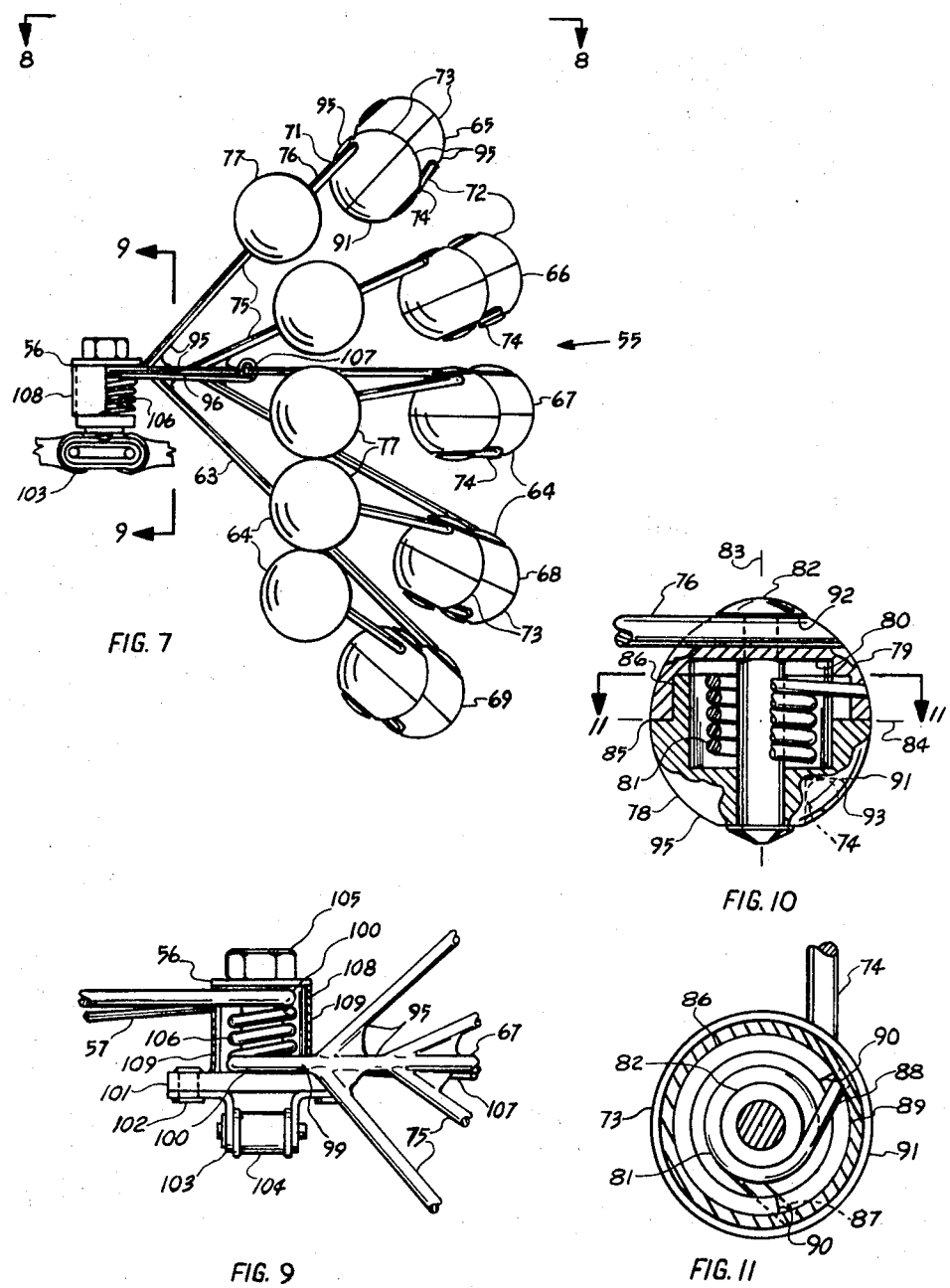

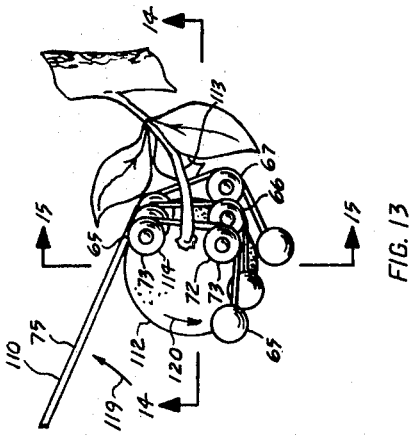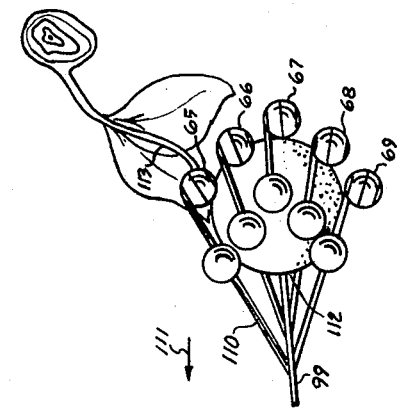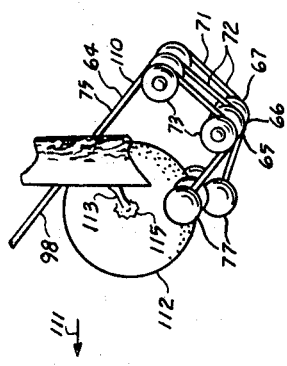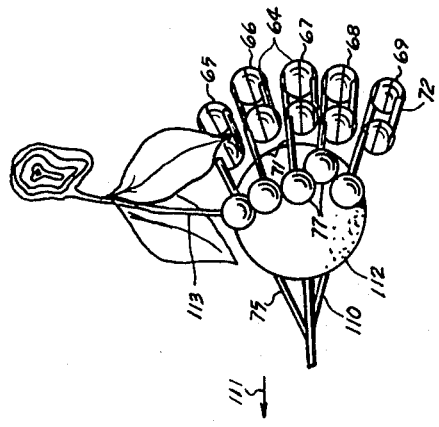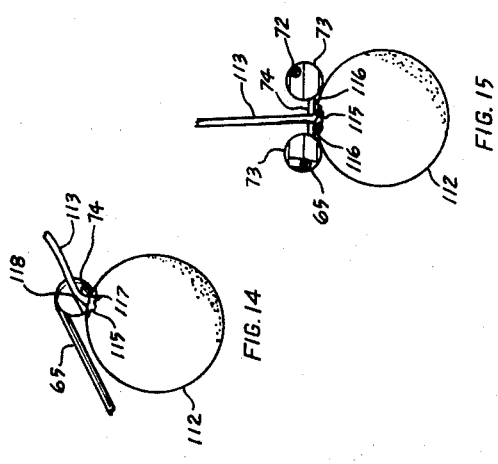

March 2, 1971   C. R. ELLIS   3,566,594
TREE FRUIT HARVESTER AND PICKING DEVICES
Filed Aug. 12, 1969   7 Sheets-Sheet 7

INVENTOR.
CHARLES R. ELLIS
BY Roger L. Martin

United States Patent Office 3,566,594
Patented Mar. 2, 1971

3,566,594
TREE FRUIT HARVESTER AND
PICKING DEVICES
Charles R. Ellis, Highlands City, Fla., assignor to
Citrus Industries Co., Lakeland, Fla.
Continuation-in-part of application Ser. No. 653,791,
July 17, 1967. This application Aug. 12, 1969,
Ser. No. 849,414
Int. Cl. A01g *19/08*
U.S. Cl. 56—328                                26 Claims

ABSTRACT OF THE DISCLOSURE

A fruit picking device has an elongated implement which is provided with a yieldable hook forming portion that includes a stem straddling assembly which is provided with pivotally biased joints and an interconnecting slender element. The element is so arranged as to cause bending of the stem at the calyx of an attached fruit body while the yieldable nature of the hook portion provided by the biased joints causes the suspended fruit body to be twisted in the picking process. The joints serve as fruit body contact components and are made of fitted semispherical or semiellipsoidal elements that provide a hollow housing for the biasing means, although solid resilient cylindrical joint forming members are shown in a modified form. A preferred form of a picking device embodies a plurality of the picking implements in an arrangement where they cooperate in seizing and retaining the suspended fruit body during the picking process. A mobile harvester equipped with the preferred form of picking device has a turntable carrying lift on which a picker head is mounted. The head has a bank of picker mechanisms which have elongated endless driven carriers in the form of endless chain and on which the devices are mounted and biased in a trailing attitude. At the proximal ends of the mechanisms, provisions are made for dislodging fruit grasped by the devices, and a structure is provided along the return path for the devices and which maintains the yieldable hook portions in straightened positions so as to avoid branch and foliage damage.

This application is a continuation-in-part of my copending application S.N. 653,791 now abandoned which was filed July 17, 1967 and entitled "Tree Fruit Harvester and Method."

The invention relates to tree fruit harvesters and to improved fruit picking devices used in the harvesting of such fruit. Although the improvements may be used in equipment for harvesting other types of tree grown fruit, the invention is mainly directed to providing improvements in the citrus fruit mechanical harvesting and picking field of endeavor.

With the current shortage of unskilled labor and rising costs, there is an increasing demand in the citrus industry for a mechanical fruit harvesting apparatus which can economically harvest the tree grown fruit without damaging the fruit or the tree. Many harvesting apparatuses have been proposed and tested by the industry, but none have gained commercial acceptance to the knowledge of the inventor primarily because of the damage which is done to the trees and the fruit by the picking devices which actually contact the fruit body during the picking procedure. The grove owners, for example, are highly critical of those mechanical devices which break limbs and branches or do damage to the foliage of the trees. They are also critical of those harvesting apparatuses which employ picking devices that cause rejection of the fruit by the packers and canners for reasons of stemming or damage done to the fruit body itself. For example, when "stemming" occurs, i.e., a piece of the stem remains attached at the calyx of the fruit body, canners and packers are subjected to extra labor costs for removing the stem portions, and if "stemming" is excessive, the whole shipment may be rejected at the canning or packing facility. In addition to this, canners and packers reject fruit which is bruised or lacerated and also reject so-called "plugged" fruit. Plugging occurs when a portion of the peel is removed at the calyx as the stem is detached from the fruit body. The plugged area of the fruit, as well as bruised and lacerated areas, create a breeding place for bacteria and insects, as is well known in the art.

A general object of the invention is to provide improved equipment for use in harvesting tree grown fruit.

One particular object of the invention is to provide improved devices which come in contact with the fruit at the time it is detached from the stem and which, in moving through the branches of the fruit tree, tend to cause a minimum amount of damage to the foliage and branches as compared to many of the prior art devices.

Yet another object of the invention is to provide improved devices that encounter the fruit at the time it is picked and which avoid "plugging" and "stemming" during use by providing a picking action which simulates that of a worker skilled in the hand picking of citrus fruits.

Still another object of the invention is to provide a device which can be moved through the branches of a citrus tree without causing appreciable damage to the tree structure and which is so designed as to seize the suspended fruit body during its movement through the tree branches, pick or detach the fruit body from the stem without the occurrence of "stemming," "plugging," or other damage to the fruit body, and thereafter to retain the picked fruit body until it can be dislodged at a suitable gathering point for the picked fruit.

A further object of the invention is to provide a harvester for tree grown fruit and wherein picking devices of the kind contemplated herein are employed for picking the fruit and delivering it to a suitable discharge point and which is economical to construct and simple to operate by semiskilled labor.

Yet another object of the invention is to provide an improved harvester for citrus fruit and which can be economically operated with a minimum amount of labor and supporting costs and which carries out the harvesting process without appreciable damage to either the fruit or the trees.

The technique used by skilled workers in the hand picking of citrus fruit so as to avoid "plugging" and "stemming" is one which involves the application of the pulling force generally along the axis of the stem and the bending of the stem at the calyx of the fruit body with the simultaneous application of a rotary or twisting motion about the polar axis of the fruit body. The picking devices disclosed herein are designed to inherently accomplish the pulling, bending, and twisting actions during use of the devices for reasons of the design features embodied in the devices.

In accord with one aspect of the invention the devices are provided with an elongated finger-like implement which has a yieldable hook portion at one end and which in normal use of the device serves to catch the supporting stem of a tree attached fruit body. The hook portion, in accord with this aspect of the invention, has an assembly which is so-arranged and shaped as to straddle the fruit stem caught by the hook portion and is equipped with a pair of spaced contact components and an interconnecting slender element that are respectively designed to contact the supporting fruit body at opposite sides of its calyx and to encounter a side of the stem which is contiguous to the calyx in the normal manner of using the device. The slender element of the assembly because of its small size and its location causes the stem to bend at the calyx as the device is pulled with respect to the tree attached fruit body, and the pulling force, in addition to being transmitted to the straddled stem, also causes the hook portion to yield and start to open up under the influence of the reactive forces imparted to the hook portion through the contact components by the fruit body. As this transpires, the biasing means of the assembly provided in accord with this aspect of the invention resists the yielding movement of the hook portion and imparts a rotary or twisting motion around the polar axis of the fruit body and thus causes a clean detachment of the fruit body from the stem at the calyx without plugging or stemming.

Certain aspects of the invention as will become subsequently apparent are directed to the structure of the contact components and which permit the biasing means to be housed in the contact components so that a minimum amount of structure is exposed in the devices for actual contact with the branches of the fruit trees or the body portion of the fruit.

Yet another aspect of the invention has to do with a preferred form of picking device which utilizes the principles of the invention thus far discussed. In accord with this aspect of the invention a plurality of the finger-like implements are assembled in an arrangement where the hook portions are oriented and arranged so as to cooperate in catching and seizing the fruit body during the use of the device. In this case the uppermost implement in the assembly is provided with the stem straddling assembly previously discussed. The remainder of the implements in the fruit body catching and seizing assembly may be structurally similar to the uppermost implement but the slender element which interconnects the contact component in this instance can be less precisely located as will be subsequently apparent.

Yet another aspect of the invention has to do with the provision of harvesting equipment which utilize the preferred form of picking devices. In accord with this aspect of the invention, the fruit picking devices are mounted on an endless carrier and biased toward the side of the carrier in a trailing attitude which is designed to permit the devices to catch and seize the fruit bodies along the working flight or run of the carrier and a structure is arranged at the proximal ends of the supporting structure of the carrier and which serves as an obstruction to the continued movement of the devices at the side of the carrier and serves as a means for dislodging the fruit which has been seized and picked by the devices. Here provisions are made for gathering the dislodged fruit bodies. In dislodging the fruit, the hook portions of the implements are straightened out and along the return run or flight of the carrier a housing is provided to maintain the hook portions of the implements in straightened positions so as to prevent any damage to the surrounding tree structure during the return pass of the picking devices as will be apparent from the subsequent disclosure.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 7 is a side elevational view of one of the picking devices as seen when it is mounted on the endless conveyor, certain parts being broken away;

FIG. 9 is a sectional view in elevation along the lines 9—9 of FIG. 7 on a somewhat larger scale;

FIG. 10 is a side elevational view on an enlarged scale of one of the outermost joint forming contact components with parts broken away to expose an internally housed biasing means;

FIG. 11 is a sectional view through the contact components as seen along the lines 11—11 of FIG. 10;

FIGS. 12 and 12a are top and side diagrammatic views that generally illustrate the arrangement of the finger-like implements as the fruit body is caught by the picking devices used in the apparatus shown in FIG. 1;

FIGS. 13 and 13a are top and side diagrammatic views that show the arrangement of the finger-like implements as the body of the fruit is seized and starts to rotate as the hook portion start to open up;

FIG. 14 is a section along the lines 14—14 of FIG. 13 with all but the uppermost finger-like implement of the picking device removed to illustrate the bend which is created in the picking process;

FIG. 15 is a section along the lines 15—15 of FIG. 3 with all but the uppermost of the finger-like implements removed to illustrate the position of the contact elements of the straddling assembly;

Figure 17:
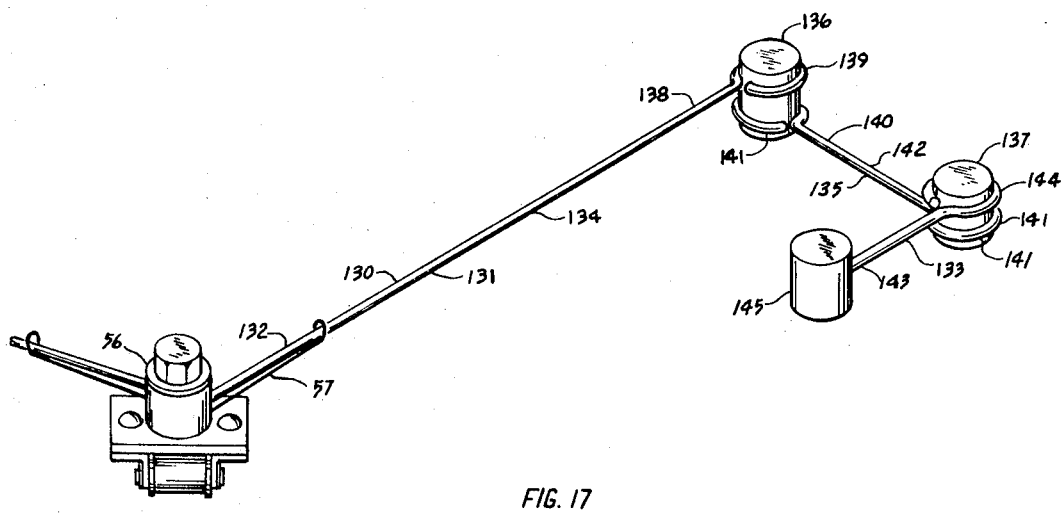
Figure 16:
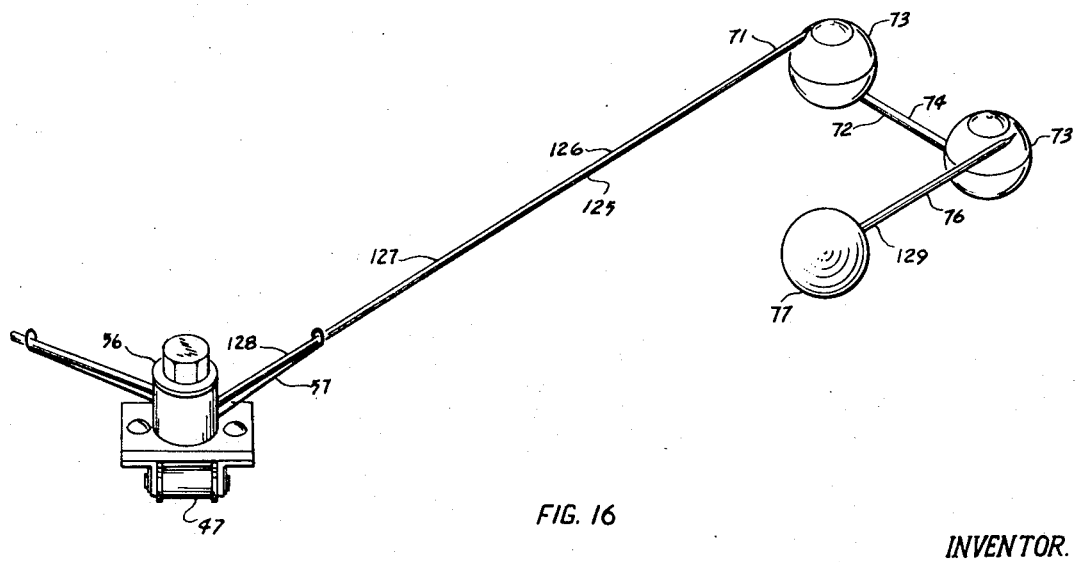

FIG. 16 is a perspective view of a simplified form of fruit picking device embodying certain principles of the invention and which are also embodied in the device shown in FIG. 7, the modified picking device being shown as mounted on a fragment of a carrier therefor; and FIG. 17 is a perspective view of another modified form of fruit picking device embodying certain principles of the invention, the device being seen as mounted on a suitable carrier therefor.

Figure 1:
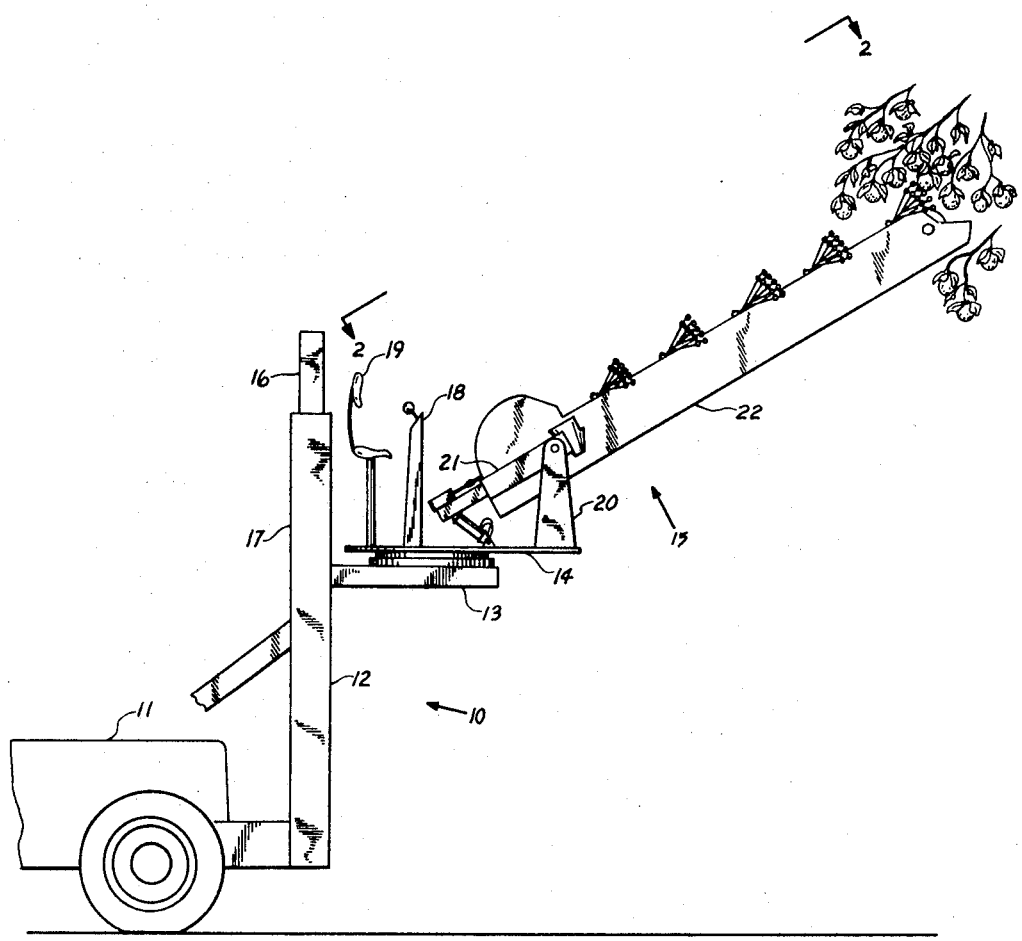
FIG. 1 is a side elevational view with parts broken away of a mobile fruit harvester embodying the principles of the invention.
Figure 2:
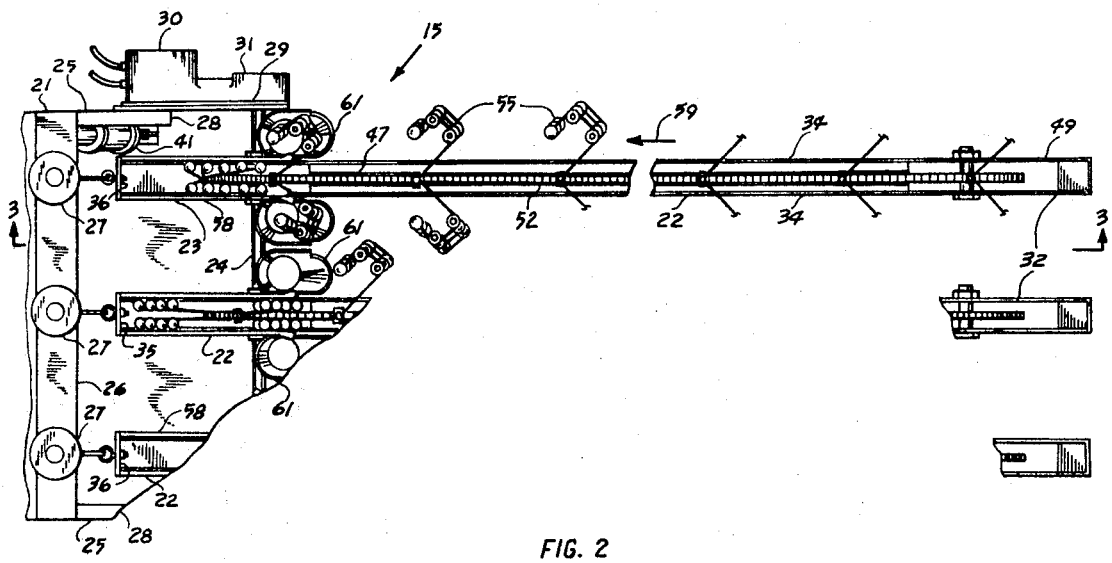
FIG. 2 is a plan view of the picking head as generally seen along the lines 2—2 of FIG. 1 with certain parts broken away and others removed.

Reference is now made to the drawings and particularly to FIGS. 1 through 6 wherein an apparatus embodying the principles of the invention is generally designated at 10. The apparatus includes a self-propelled vehicle 11 which is provided with a lift mechanism 12 that has a platform 13 on which a turntable is mounted to support the operating head 15 of the harvesting apparatus 10. The platform of the lift mechanism 12 is rigidly connected to a vertically movable frame 16 that is mounted between transversely spaced side rails 17. The rails 17 are arranged upright at the end of the vehicle 11 as seen in FIG. 1 and the frame 16 is vertically movable by power means, not shown, but which is controlled from control panel 18. Control panel 18 is mounted on the turntable 14 along with a suitable seat 19 for the operator of the harvesting apparatus and, along with the control for the lift mechanism on panel 18, are controls for the turntable and other powered mechanisms used in the apparatus.

The head 15 is supported on a pair of spaced stanchions 20 which are bolted to the turntable 14 and includes a yoke or U-shaped type framework 21 and a bank of three elongated picking and harvesting mechanisms 22 that are mounted for pivotal movement at their proximal ends 23 on a common drive shaft 24 which extends between and is journaled at its opposite ends in the upright stanchions 20. The yoke 21 is generally arranged horizontally and its opposite side legs 25 straddle the spaced stanchions and whereat they carry suitable bearings, not shown, but in which the opposite ends of the drive shaft are also journaled so as to provide a mounting for the pivotal movement of the yoke, about the horizontal axis of the drive shaft 24. The yoke has an elongated crosspiece 26 which is rigidly connected at its opposite ends to the side legs 25 and which provides a mounting for recoil mechanisms 27 that are associated with the respective picking and harvesting mechanisms 22. The side legs include a channel member 28 and a rectangular plate through which the pivotal connection with the drive shaft 24 is made. The plate component 29 of the left leg of yoke 21 serves as a mounting plate for a hydraulic motor 30 and gear mechanism 31 that is drivingly connected to the common drive shaft 24 for the mechanisms 22.

Figure 5:
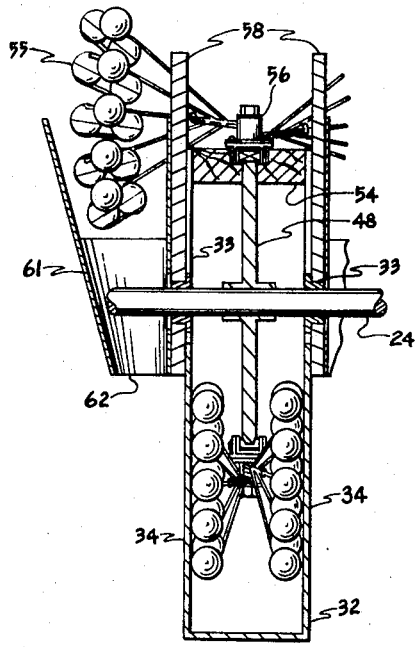
FIG. 5 is a transverse sectional view of the picking mechanism as seen along the lines 5—5 of FIG. 4 with certain parts removed and others broken away.
Figure 6:
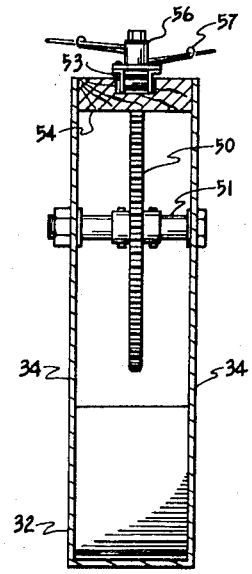
FIG. 6 is an enlarged transverse section through the picking mechanism shown in FIG. 3 and as seen along the lines 6—6 with certain parts broken away and others removed.

Each picking and harvesting mechanism is associated with one of the recoil mechanisms 27 mounted on crosspiece 26 and has an elongated narrow housing 32 which is generally U-shaped in cross section, as seen in FIGS. 5 and 6. The drive shaft 24 is journaled in bearings 33 that are mounted in the side walls 34 of the housing 32 and the rear wall 35 of the housing has a reinforcing plate member 36 which rigidly interconnects the side walls and provides a mount for an eye element 37. Each recoil mechanism has a wire cable 38 which is mounted on a spool, not shown, but which is yieldably biased to constantly maintain a tension on cable 38 and thus to constantly urge the mechanism 22 into a position of alignment with the plane of the yoke while nevertheless permitting the mechanism to be deflected upon its pivotal mounting as for example to the position shown at 39 and 40 in FIG. 3.

Figure 3:
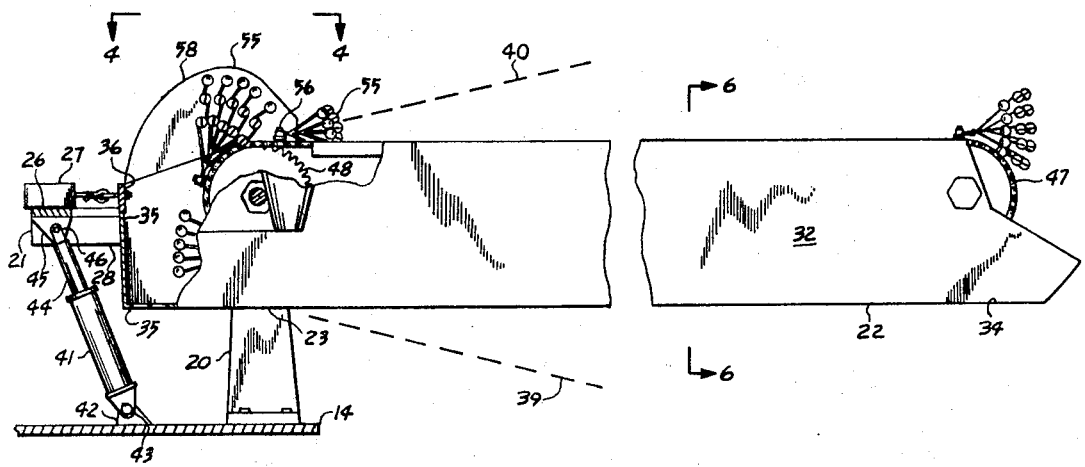
FIG. 3 is a sectional view generally along the lines 3—3 of FIG. 2 with parts broken away and others removed.
Figure 4:
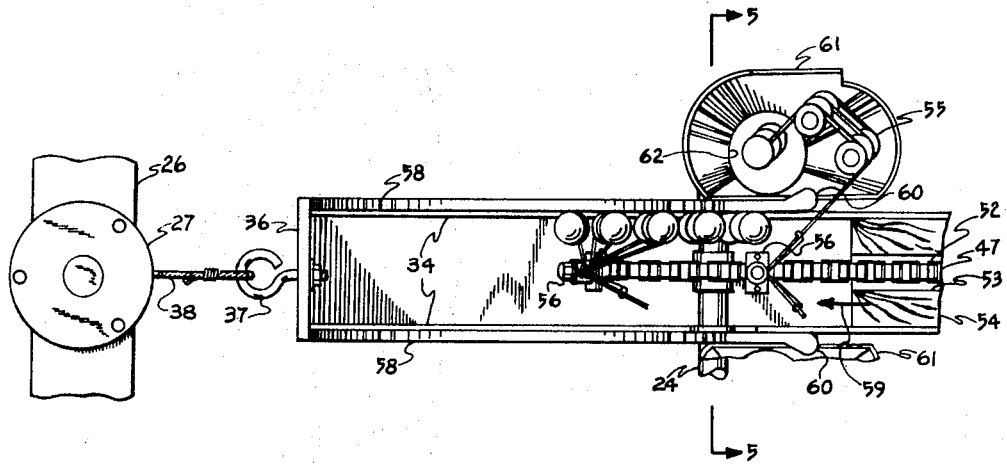
FIG. 4 is an enlarged top view at the proximal end of the picking mechanism shown in FIG. 3 is generally seen along the lines 4—4, with certain parts removed and others broken away.

The picking and harvesting mechanisms 22 are pivotally moved about the axis of the drive shaft by pivotally moving the yoke 21 and this is accomplished by the control from panel 18 of a hydraulic cylinder 41 that is pivotally connected by means of a pivot element 43 to a lug 42 affixed to turntable 14. The piston arm 44 of this cylinder 41, as seen in FIG. 3, is in turn connected by a pivot element 46 to a lug 45 that is affixed to the underside of the yoke crosspiece 26.

Each picking mechanism 22 is equipped with an elongated endless chain 47 that serves as a carrier for the fruit picking devices and this chain engages a sprocket 48 which is keyed to and driven by the drive shaft 24 at the proximal end of the mechanism 22. At the distal end 49 of the mechanism, the chain 47 engages an idler sprocket 50 that is rotatably mounted on a stub shaft 51 which is mounted at its opposite ends in the side walls 34 of the housing. The upper flight 52 of the chain length is supported in a groove 53 of an elongated wooden structural piece 54 which is in turn fixed to the side walls 34 along their upper extremities so as to provide a support for the flight during the working run of the picking devices.

The picking devices 55 are mounted in pairs on chain 47 by means of a common mounting assembly 56 which has a spring component 57 which serves to bias each picking device 55 to the adjacent side of the chain and in a trailing attitude with respect to the path 59 of movement of the chain so that the hook end portions of the implements to be subsequently described are laterally disposed with respect to the side walls 34 and in working positions to catch and grasp suspended fruit bodies that are encountered along the path of movement. At the proximal ends 23 of the mechanisms 22, the side walls 34 of the housing 32 are reinforced by side plate members 58. These plates have appropriate openings for extensions of the bearings 33, as seen in FIG. 5, and provide vertical side edges 60 at the end of the upper flight 52 and in the path of movement of the biased picking devices 55. Consequently, as the mounting assemblies 56 enter the space between the plates 58, the picking devices are forced to pivot inwardly toward the chain 47 against the urgings of the spring component 57 and the hook portions of the elongated finger-like implements to be subsequently described are caused to straighten out as the mounting assembly swings around the drive sprocket 48. As best seen in FIG. 3, the upper edge of the plate component 58 is generally arcuate and extends above the vertical edge 60 so as to therebelow provide a positive bearing surface for the straightened fingers as they swing around the drive sprocket 48.

Each picking mechanism also has a pair of funnel-shaped components 61 that are welded to the side plates 58 immediately below the vertical side edges 60 so as to receive any fruit which is dislodged from the grasp of the devices as the hook portions of the finger implements are caused to open and straighten out through the encounter with the side edges 60. These funnels have openings 62 at the bottom and flexible conduits or other appropriate means may be arranged to receive the gathered fruit as it discharges through the openings in the funnel 61.

The structures of the picking devices and the mounting assemblies are best shown in FIGS. 7 through 11 inclusive. Each device 55 has an assembly 63 of elongated finger-like implements that are collectively designated at 64 and individually indicated at 65, 66, 67, 68 and 69 in FIGS. 7 and 8. The opposite ends of the implements are designated at 70 and 95 respectively. At its outer end 70, each implement 64 has a hook portion 71 which includes a biasing assembly 72 that has a pair of spaced joint forming members 73 which are interconnected in the assembly 72 by an elongated slender rod element 74 that extends between the members 73 and serves, among other things, to maintain the spaced relationship. The biasing assembly 72 is supported at the outer end of another elongated slender rod element 75 of each finger-like implement and in turn supports yet another slender rod element 76 that is equipped at its outer end with a spherical element 77 that serves as a component for contacting the fruit bodies caught by the device.

The joint forming members 73 of the biasing assembly 72, as seen by reference to FIGS. 10 and 11, and the outermost biasing member 91 of the finger implements 65 shown therein, are made from a pair of hemispherical elements 78 and 79. Both of the elements 78 and 79 are internally bored, as seen in FIG. 10, so as to provide a hollow area 80 in the assembled member to accommodate a coiled spring biasing element 81 and to facilitate the connection of the elements 78 and 79 by a suitable pivot member 82. Member 82 establishes an axis 83 for pivotal movement of the hemispherical elements with respect to each other and this axis 83 is perpendicular to the equatorial plane 84 through the exterior parting line 85 between the elements 78 and 79. The bottom element 78 has a cylindrical flange 86 which extends above the plane 84 and which fits in a matching groove in the upper hemispherical element 79.

The spring 81 is coiled around the pivot member 82 in the assembled joint member 73, and one end 87 fits in an appropriate hole in the bottom hemispherical element 78 while the other end 88 fits in an appropriate hole in the top hemispherical element 79. The coiled spring 81 of the joint forming member shown in FIGS. 10 and 11 biases the bottom element 78 in a clockwise direction as viewed in FIG. 11, and the upper end 88 of the spring extends through a cut out 89 in the flange 86 to accommodate the pivotal movement of the element 78. The cut out 89 provides spaced stops 90 that engage the spring end 88 in limiting the pivotal movement of the bottom element 78 to about 90°.

The hemispherical elements provide a housing for the biasing spring 81 and with the pivot member 82 provide a spherical fruit body contacting component which is similar to the spherical fruit body contacting component 77 at the distal end of the implement, as is evident from the drawings.

The means by which the rod elements are connected to the joint forming member 73 is also illustrated in FIGS. 10 and 11. The top element 79 has a notch 92 in its exterior surface, and in which the inner end of rod 76 is received and attached by solder or welding in the assembly of the member. The bottom hemispherical element 78 has a similar notch 93 in which the outer end of the innerconnecting rod element 74 of assembly 72 is received and also similarly secured by solder or welding. These notches are offset about 90° about the axis 83 of pin 82 when the hemispherical elements are in their static positions, and the inner end of rod element 74 and distal end of the supporting rod element 75 are similarly secured to the lower and upper hemispherical elements respectively of the innermost joint forming member 73 in each implement.

The pivot axes 83 of the joint forming members of each implement are generally parallel and with this arrangement, the springs 81 of the biasing assembly 73 provide the hook portions 71 with static positions in which the rods 75 and 76 are spaced apart and generally parallel to each other in each finger-like implement while the innerconnecting rod element 74 of the biasing assembly 72 in the implement is offset from the plane of the rods 75 and 76 and more or less normal to each in the offset plane.

Figure 8:
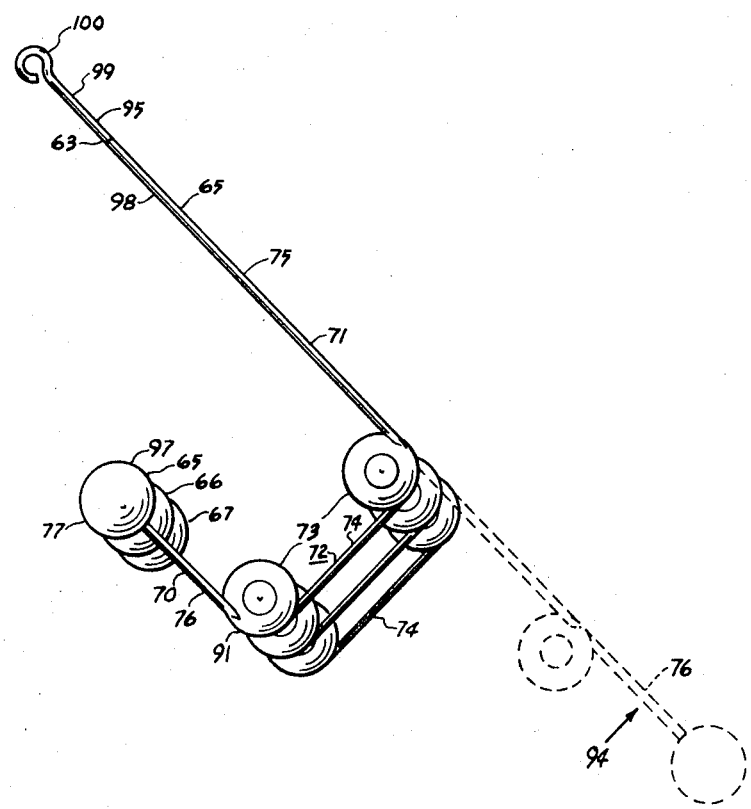
FIG. 8 is a top plian view of the picking device seen in FIG. 7 as taken along the lines 8—8 thereof.

The springs 81 of the biasing assemblies 72 resist movements of rods 74 and 76 which tend to straighten out the hook portions, but nevertheless yield under sufficient pressure to permit the hook portions to straighten out and assume a straightened position indicated at 94 in FIG. 8.

As seen in FIGS. 7 and 8, the support rods 75 of the implements 64 that are generally arranged in a common plane that is vertical when the device 55 is mounted on the carrier, and that the hook portions 71 are arranged with their openings 97 at one side 98 of the device. In this arrangement, the inner ends 95 of the implements 64 are joined in the assembly 63 through welds that join the proximal ends of the support rods 75 of implements 65, 66, 68 and 69 to the proximal end 96 of the support rod 75 of the center implement 67. As the implements 64 are thus connected, their hook portions 71 open toward their inner ends 95, and the hook portions 71 are more or less vertically spaced and arcuately aligned in the assembly 64, as is seen in FIG. 7. The finger assembly 63 is connected to the mounting assembly 56 by a short rod length 99 which is equipped with an eye component 100 and which constitutes an integral extension of the support rod 75 for the center implement 67.

The mounting assembly 56 includes a small plate element 101 which is secured by fasteners 102 to a pair of small side brackets 103 that are attached to one of the links 104 of chain 47. The picking devices 55, as previously indicated, are pivotally mounted on the chain 47 in pairs, and in this respect, the mount has an element 105 which is threaded in the plate 101 and which extends through the eyes and through an intervening coiled portion 106 of the preformed spring 57 to provide a pivotal connection for the attached devices 55. The opposite end portions 107 of spring element 57 project through a trailing opening in a hollow semicylindrical shield member 108 that is fixed to plate 101, and are looped around the support rods 75 of the center finger element 67 of each attached device. This arrangement pivotally biases the picking devices 55 laterally of the chain and into contact with the stop forming edges 109 of the shield 108 in the trailing attitude previously indicated.

The manner in which the fruit is picked by the picking devices 55 is illustrated in FIGS. 12 through 15 inclusive by reference to the picking device designated therein at 110. As the device 110 is carried along the top or working flight of the chain carrier in its biased static working position on the mounting assembly 56, as in the direction of arrow 111, the hook side 98 of the assembled picking device 110 is angularly arranged with respect to the direction of movement. Consequently, when a suspended fruit body 112 is properly encountered (see FIGS. 12 and 12a) by the side 98 of the picking device 110, it is caught in the hook openings 97 between the supporting rod elements 75 and the spherical body contact components 77 at the outer ends of the implements 64. These hook openings 97, it should be noted, are slightly less in dimension at their static positions than the diameter of the fruit body 112, but nevertheless large enough to permit a portion of the body to enter the opening and thus become caught. As the suspended fruit body 112 is caught by the device 110, the forces which are applied to the body 112 through the tree attached stem 113 and which are reactive to the pulling forces that draw the device along the path of movement, serve to draw the encountered fruit body 112 into the grasp of the device. As this happens, the hook portions 71 of the finger implements encountering the fruit body 112 open up against the biasing resistance of the spring elements of the biasing assemblies 72, as is depicted in FIGS. 12 and 12a.

The slender supporting rod elements 75 of the finger-like implements are preferably somewhat resilient so that the hook portions 71 can move in the arcuate arrangement to adjust to different sizes of fruit bodies, and in the normal course of events that transpire as the fruit body 112 becomes seized by the finger assembly 63, the hook portions 71 of the uppermost finger implement 65 either passes freely over the suspended fruit body 112 or is deflected to pass over the fruit body so that it catches the tree attached stem 113 as the body 112 is seized (see FIGS. 13 and 13a) by the finger assembly 63.

The joint forming members 73 also form a pair of spaced fruit body contacts components in the hook portions 71 of the implements 64, and the spacing between the members 73 is such as to accommodate reception of the attached stem 113 in the space 114 between the joint forming members 73 of the uppermost implement 65. As a result, the biasing assembly 72 of implement 65 is arranged to straddle the stem 113 as the fruit body 112 becomes seized by the fingers, as is depicted in FIGS. 13 and 13a, and also in FIGS. 14 and 15.

As the biasing assembly of finger 65 straddles the stem 113, the body contact forming members 73 of the finger 65 are drawn into contact with the fruit body 112 adjacent to the calyx 115 of the body and at its opposite sides 116, as is best seen in FIG. 15. This brings the connecting rod 74 of finger 65 into contact with a stem side portion 117 which is contiguous to the calyx 116. This encounter with the stem portion 117 causes a bend 118 to form immediately adjacent the calyx as the stem 113 resists the forward movement of the seized fruit body 112 in the direction of arrow 111. The stem resistance to the fruit body movement also causes the picking device 110 to pivot inwardly on its mounting assembly in the direction of arrow 119, and against the urgings of the biasing spring 57 of the supporting assembly. As this happens, the resistance to forward movement of the fruit body 112 also tends to cause the hook portions 71 to straighten out against the urgings of the springs of the biasing assemblies. All of this, imparts a rotary or twisting motion to the fruit body 112 as in the direction of arrow 120, and causes detachment of the fruit body 112 from the stem 113 at the calyx and in a manner which simulates that of hand picking. The picked fruit body, of course, remains in the grasp of the finger assembly 63 of the picking device 110 and is later dislodged through contact with one of the plate edges 60, as previously described.

In the preferred embodiment, a plurality of the finger-like implements are used in each picking device to facilitate actual seizure of the fruit body and its retention for gathering at a convenient point on the harvesting apparatus. Certain aspects of the invention however, can be embodied in a fruit picking device which in use serves solely to detach the fruit body from its stem. In such cases, the picked fruit will fall once detached and may be gathered by means well known in the art.

Reference is now made to the picking device, shown in FIG. 16, and wherein the fruit picking device 125 is seen mounted on the endless carrier 47 by means of one of the mounting assemblies 56 and similarly biased by a biasing spring 57. In this instance, the picking device 125 has only one elongated finger-like implement, designated at 126. The implement 126 has opposite ends 128 and 129 and includes a biasing assembly 72 which is supported by an elongated slender rod element 127 that is similar to the support rod 75 of device 55. Device 125 is also equipped with a spherical body contact element or component 77 at its outer end 129 and with a slender connecting rod 76 that joins the component 77 to the outermost joint forming member 73 of the biasing assembly 72. Rod element 127 is similar to the supporting rods of devices 55 and has an eye component, not shown, to facilitate the pivotal connection of the implement 126 to the carrier 47.

The hook portions 71 of implement 126 in this case performs a function similar to that of the uppermost elongated implement 65 in finger assembly 63 of device 55. Thus, as the fruit body supporting stem is caught by the hook 71, it is straddled by assembly 72 and the contact component forming joint members 73 contact the body portion of the fruit adjacent to and at opposite sides of the calyx while the rod 74 encounters the stem portion contiguous of the calyx and creates a bend. With this device however, a twisting motion is imparted to the fruit without the aid of the other implements and only through contact with the hook portion as it tends to open up during the picking process.

FIG. 17 shows a modified form of picking device which is similar in function to that shown in FIG. 16. In this case, the device 130 consists of an elongated implement 131 which has opposite ends 132 and 133 and is provided with an elongated slender support rod 134. Rod 134, at its proximal end, is pivotally connected to the mounting assembly 56 and biased by spring 57 as in the previous embodiment. The biasing assembly 135 of the implement 131 however, has a pair of small cylindrical elements 136 and 137 that are made of resilient material, such as rubber or neoprene, and which by a twisting from their static positions depicted perform the functions of a joint forming member previously described. The distal end 138 of the support rod 134 has a loop 139 which securely engages the upper end of element 136 and the joint forming elements 136 and 137 are interconnected by a slender rod 140 that has opposite looped ends 141 that securely connect the rod to the lower ends of the spherical elements of the assembly 135. The hook portion 142 of the implement also has a slender rod length 143 affixed by a loop 144 to the outermost biasing element 137 and length 143 carries another cylindrical body contact component 145 at its outer end. The cylindrical elements 136 and 137 are capable of twisting about their respective axes to permit the hook portion to open up to a straightened position and being resilient, will resist any movements to open the hook portion and thus serve to bias the yieldable hook portion into its static position shown and thereby function in a manner similar to the embodiment shown in FIG. 16.

From the foregoing description, it is apparent that the implements described herein are capable of picking tree grown fruit by an action which simulates that of hand picking and which accordingly avoids the problems of stemming and plugging which have become characteristic problems encountered in many prior art attempts to mechanically harvest tree grown fruit.

Among the features embodied in the design of the picking devices is that of using an elongated implement which includes a plurality of enlarged portions that are spaced apart and through which primary contact of the fruit body is made during the picking process. The enlargements which form the contact components in the elongated implements serve to protect the fruit from damage by contact with the ends of the rod-like elements and to a considerable extent tend to support the rods apart from the fruit body so that very little foliage in the proximity of the tree attached fruit becomes entangled in the implements for reasons of being trapped between the implements and the fruit body.

Yet another advantage of using implements that are provided with spaced contact components lies in the ability to pick mature fruit without detaching the smaller immature fruit to be harvested the following season as in the case with the valencia citrus crops grown in Florida. Experience has shown that in such cases the immature fruit merely passes between the contact components and is rarely detached from the trees while the mature fruit is caught and subjected to the picking process.

Although the contact components may be cylindrical in shape, as is evident from the embodiment shown in FIG. 17, it is preferable that the contact components have a spherical or ellipsoidal shape because of the more regular contours provided by the spherical and ellipsoidal components has a lesser tendency to cause lacerations to the fruit body or cause damage to the trees.

Although various means can be used for providing a yieldable hook, in the preferred practice of the invention it is preferable to use spaced biasing components, such as those housed in the fitted hemispherical elements, since this permits one to vary the biasing force from one joint to the next by the proper selection of spring elements. For example, and in the preferred practice of the invention, it is preferable that the biasing force at the outermost joint in the biasing assembly be less than that provided at the innermost joint that is connected to the elongated support rod for the assembly. The arrangement provided also enables the spring elements of the biasing means to be housed in the body contact components of the biasing assembly and thus provides an arrangement where the biasing elements are incapable of being damaged by contact with branches of the trees and conversely the tree branches are incapable of being damaged through contact with the biasing elements.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what is desired to secure by Letters Patent of the United States is:

1. A tree fruit picking device comprising an elongated implement having opposite ends and a yieldable hook portion at one of said ends for catching fruit body supporting tree attached fruit stems during use of the device, said hook portion including an assembly adapted and arranged to straddle a fruit stem caught by the hook portion which comprises an elongated slender element, and a pair of fruit body contact components which are secured to said slender element and which are spaced apart by the element in an arrangement accommodating the reception of a caught fruit stem in the space therebetween.

2. A tree fruit picking device in accord with claim 1 where said assembly comprises biasing means for resisting yielding movement of the hook portion.

3. A tree fruit picking device in accord with claim 2 where each of said components has a hollow, and where said biasing means includes a pair of biasing elements respectively housed in the hollows of said pair of components.

4. A tree fruit picking device in accord with claim 1 where said contact components are arranged to contact a fruit body supported by a received stem adjacent to and at opposite sides of the fruit body calyx, and where said slender element extends between said contact components and is arranged to encounter a side portion of the received stem contiguous to the calyx when said contact components thus contact the supported fruit body.

5. A tree fruit picking device in accord with claim 1 where said elongated implement includes an elongated support element supporting said assembly and connected to one of said components, where said assembly comprises biasing means for resisting yielding movement of the hook portion, where said one of said components is hollow, and where said biasing means includes a biasing element housed in said hollow.

6. A tree fruit picking device in accord with claim 1 where said elongated implement includes an elongated support element supporting said assembly and connected to one of said components, and elongated means supported by said assembly and connected to the other of said components, where each of said components has a hollow, and where said assembly comprises biasing means for resisting yielding movement of the hook portion, and where said biasing means includes a pair of biasing elements respectively housed in the hollows of said components.

7. A tree fruit picking device in accord with claim 1 where each of said components has a hollow and comprises a pair of pivotally biased elements that have a pivot axis, where said assembly comprises biasing means for resisting pivotal movement of the hook portion, where said biasing means includes a pair of biasing elements respectively housed in the hollows of said components and biasingly connected to the biased elements thereof, where said slender element extends between said contact components and is connected to one of the biased elements of each of said components, where said contact components are arranged to contact a fruit body supported by a received stem adjacent to and at opposite sides of the fruit body calyx, and where said slender element is arranged to encounter a side portion of the received stem contiguous to the calyx when said contact components thus contact the supported fruit body.

8. A tree fruit picking device in accord with claim 7 where said biased elements are hemispherical in shape and are arranged to provide a spherical fruit body contact component.

9. A tree fruit picking device in accord with claim 1 where each of said contact components comprises resilient cylindrically shaped means adapted and arranged to resist yielding movement of the hook portion.

10. A tree fruit picking device in accord with claim 9 where said contact components are arranged to contact a fruit body supported by a received stem adjacent to and at opposite sides of the fruit body calyx, and where said slender element extends between said contact components and is arranged to encounter a side portion of the received stem contiguous to the calyx when said contact components thus contact the supported fruit body.

11. A tree fruit picking device in accord with claim 10 where said elongated implement includes an elongated support element supporting said assembly and connected to one of said components, and elongated means supported by said assembly and connected to the other of said components.

12. A tree fruit picking device having a side and comprising a plurality of elongated implements, each of said implements having opposite ends and a yieldable hook portion at one of said ends, the yieldable hook portions of said implements being generally oriented and aligned in an arcuate arrangement with their openings at said side to cooperate in catching and seizing fruit bodies during use of the device, each of said hook portions includes a biasing assembly which comprises an elongated slender element, and a pair of fruit body contact components which are secured to and spaced apart by said element.

13. A tree fruit picking device in accord with claim 12 where said hook portions are vertically spaced apart in the arcuate arrangement, where the biasing assembly of the uppermost hook portion in the arrangement is adapted and arranged to straddle the supporting stem of a fruit body seized by the hook portions and comprises biasing means for resisting yielding movement of said uppermost hook portion.

14. A tree fruit picking device in accord with claim 12 where said hook portions are vertically spaced apart in the arcuate arrangement, where the contact components of the uppermost hook portion are arranged to contact a seized fruit body adjacent to and at opposite sides of its calyx, and where the slender element of the uppermost hook portion is arranged to encounter a side portion of the seized fruit supporting stem contiguous to the calyx when the contact components of the uppermost hook portion thus contact the supported fruit body.

15. A tree fruit picking device in accord with claim 12 where said biasing assembly comprises biasing means for resisting yielding movement of the hook portion associated therewith.

16 A tree fruit picking device in accord with claim 15 where each of said components has a hollow, and where said biasing means includes biasing elements respectively housed in the hollows of said components.

17. A tree fruit picking device in accord with claim 16 where said hook portions are vertically spaced apart in the arcuate arrangement, where the contact components of the uppermost hook portion are arranged to contact a seized fruit body adjacent to and at opposite sides of its calyx, and where the slender element of the uppermost hook portion is arranged to encounter a side portion of the seized fruit supporting stem contiguous to the calyx when the contact components of the uppermost hook portion thus contact the supported fruit body.

18. A tree fruit picking device in accord with claim 12 where each of said implements includes an elongated support element supporting its biasing assembly and connected to one of the contact components thereof, where the biasing assembly of each implement comprises biasing means for resisting yielding movement of the hook portion thereof, where said one of the contact components is hollow, and where the biasing means of each biasing assembly includes a biasing element housed in the hollow of said one contact component thereof.

19. A tree fruit picking device in accord with claim 12 where each of said implements includes an elongated support element supporting the biasing assembly of the implement and connected to one of the pair of components thereof, and elongated means supported by the biasing assembly of the implement and connected to the other of the pair of components thereof, where each of the pair of components of the implement has a hollow, where the biasing assembly of the implement comprises biasing means for resisting yielding movement of the implement hook portion, and where said biasing means includes a pair of biasing elements housed in the respective hollows of the biasing assembly components.

20. A tree fruit picking device in accord with claim 12 where each of said components has a hollow and comprises a pair of pivotally biased elements that have a pivot axis, where said assembly comprises biasing means for resisting pivotal movement of the hook portion associated with the assembly, where said biasing means includes a pair of biasing elements respectively housed in the hollows of said components and biasingly connected to the biased elements thereof, and where said slender element extends between said contact components and is connected to one of the biased elements of each of said components.

21. A tree fruit picking device in accord with claim 20 where said biased elements are hemispherical in shape and are arranged to provide a substantially spherical fruit body contact component.

22. A tree fruit picking device in accord with claim 20 where said hook portions are vertically spaced apart in the arcuate arrangement, where the contact components of the uppermost hook portion are arranged to contact a seized fruit body adjacent to and at opposite sides of its calyx, and where the slender element of the uppermost hook portion in the arcuate arrangement is arranged to encounter a side portion of the seized fruit supporting stem contiguous to the calyx when the contact components of said uppermost hook portion thus contact the supported fruit body.

23. An apparatus for harvesting tree grown fruit comprising an endless carrier having a path of movement, and a fruit picking device biasingly mounted on and movable along said path with said carrier; said picking device having a side and comprising a plurality of elongated implements that have respective yieldable hook portions, said hook portions of said implements being generally oriented and aligned in an arcuate arrangement with their openings at said side to cooperate in catching and seizing fruit bodies during use of the apparatus, and means along said path for dislodging seized fruit bodies from the grasp of said implements.

24. An apparatus for harvesting tree grown fruit in accord with claim 23 where said device is biasingly arranged on said carrier to encounter said means along said path, where said hook portions are arranged to receive said means in their openings in encountering said means and to thereafter yieldably open up to straighten positions during the encounter.

25. An apparatus for harvesting tree grown fruit in accord with claim 23 where said carrier has a return flight, where said device is biasingly arranged on said carrier to encounter said means along said path, where said hook portions are arranged to receive said means in their openings in encountering said means and to thereafter yieldably open up to straightened positions during the encounter, and where said apparatus has a housing along said return flight to maintain said hook portions in said straightened positions.

26. An apparatus for harvesting tree grown fruit in accord with claim 23 where each of said hook portions includes a biasing assembly which comprises an elongated slender element, and a pair of fruit body contact components which are secured to and spaced apart by said element, where said carrier has a working flight and a return flight, where said hook portions are vertically spaced apart in the arcuate arrangement, where the biasing assembly of the uppermost hook portion in the arrangement is adapted and arranged to straddle the supporting stem of a fruit body seized by the hook portions and comprises biasing means for resisting yielding movement of said uppermost hook portion, where the contact components of the uppermost hook portion are arranged to contact a seized fruit body along said working flight adjacent to and at opposite sides of its calyx, and where the slender element of the uppermost hook portion is arranged to encounter a side portion of the seized fruit supporting stem contiguous to the calyx when the contact components of the uppermost hook portions thus contact the supported body.

References Cited

UNITED STATES PATENTS

| | | | |
|---|---|---|---|
| 480,131 | 8/1892 | Perry | 56—35 |
| 1,054,119 | 2/1913 | Horst | 130—30 |
| 1,147,961 | 7/1915 | Matlock | 56—49 |
| 2,647,521 | 8/1953 | Miller | 130—30 |
| 3,143,844 | 8/1964 | Polk, Jr. | 56—328 |
| 3,421,304 | 1/1969 | Phillips, Jr. | 56—328 |
| 3,421,305 | 1/1969 | Phillips, Jr. | 56—328 |

RUSSELL R. KINSEY, Primary Examiner

U.S. Cl. X.R.

56—35